United States Patent
Stelmar Netto et al.

(10) Patent No.: US 11,138,094 B2
(45) Date of Patent: Oct. 5, 2021

(54) CREATION OF MINIMAL WORKING EXAMPLES AND ENVIRONMENTS FOR TROUBLESHOOTING CODE ISSUES

(71) Applicant: INTERNATIONAL BUSINESS MACHINES CORPORATION, Armonk, NY (US)

(72) Inventors: Marco Aurelio Stelmar Netto, São Paulo (BR); Bruno Silva, São Paulo (BR); Renato Luiz de Freitas Cunha, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/740,365

(22) Filed: Jan. 10, 2020

(65) Prior Publication Data
US 2021/0216434 A1 Jul. 15, 2021

(51) Int. Cl.
*G06F 11/36* (2006.01)
*G06F 8/75* (2018.01)

(52) U.S. Cl.
CPC .......... *G06F 11/3636* (2013.01); *G06F 8/75* (2013.01); *G06F 11/3664* (2013.01)

(58) Field of Classification Search
CPC ....... G06F 11/366; G06F 11/3364; G06F 8/75
See application file for complete search history.

(56) References Cited

U.S. PATENT DOCUMENTS

| | | | |
|---|---|---|---|
| 6,487,713 B1 | 11/2002 | Cohen et al. | |
| 6,651,243 B1 * | 11/2003 | Berry | G06F 11/3419 717/130 |
| 6,895,574 B2 | 5/2005 | Walster | |

(Continued)

FOREIGN PATENT DOCUMENTS

| | | |
|---|---|---|
| CN | 101697121 A | 6/2007 |
| CN | 105302531 A | 2/2016 |

(Continued)

OTHER PUBLICATIONS

List of IBM Patents and or Applications Treated as Related, 2 pgs.
(Continued)

*Primary Examiner* — Duy Khuong T Nguyen
(74) *Attorney, Agent, or Firm* — Intelletek Law Group, PLLC; Gabriel Daniel, Esq.

(57) ABSTRACT

A system for generating a minimum working example (MWE) of the source code of a computer program is provided. The system receives the source code and executes the computer program. The system encounters a runtime error and obtains a stack trace from the execution of the computer program. The stack trace identifies runtime errors and the code segments that were executed that led to the runtime error. The system uses the stack trace to identify one or more variables that affect a most recently executed segment of the source code when the runtime error occurred. The system identifies one or more segments of the source code that do not affect the identified relevant variables. The system generates an MWE of the source code by pruning the identified one or more segments from the source code.

20 Claims, 9 Drawing Sheets

(56) References Cited

U.S. PATENT DOCUMENTS

| | | | |
|---|---|---|---|
| 7,174,536 B1* | 2/2007 | Kothari | G06F 11/3664 717/105 |
| 8,028,280 B2 | 9/2011 | Bera | |
| 8,141,059 B2 | 3/2012 | Ding et al. | |
| 8,261,237 B2 | 9/2012 | Zeidman | |
| 8,359,463 B2 | 1/2013 | Merchant | |
| 8,595,166 B2 | 11/2013 | Lottridge | |
| 8,615,752 B2 | 12/2013 | Izard et al. | |
| 8,719,771 B2 | 5/2014 | Ovadia | |
| 9,003,366 B2 | 4/2015 | Zeidman | |
| 9,053,296 B2 | 6/2015 | Mylroie | |
| 9,223,554 B1 | 12/2015 | Lawson | |
| 9,983,871 B1 | 5/2018 | Edwards | |
| 10,643,751 B1 | 5/2020 | Drouin | |
| 10,678,666 B1* | 6/2020 | Gauf | G06F 11/2635 |
| 2007/0226698 A1* | 9/2007 | Cascaval | G06F 9/45516 717/127 |
| 2009/0083717 A1 | 3/2009 | Branson | |
| 2009/0164861 A1 | 6/2009 | Tseng | |
| 2009/0216997 A1 | 8/2009 | Balasubramonian | |
| 2009/0300423 A1 | 12/2009 | Ferris | |
| 2010/0083248 A1 | 4/2010 | Wood | |
| 2011/0060895 A1 | 3/2011 | Solomon | |
| 2011/0078651 A1* | 3/2011 | Ovadia | G06F 11/3608 717/105 |
| 2012/0137111 A1* | 5/2012 | Hayashizaki | G06F 8/45 712/241 |
| 2012/0197680 A1 | 8/2012 | Zircher, IV | |
| 2012/0284698 A1* | 11/2012 | Brunkhorst | G06F 11/362 717/128 |
| 2013/0239098 A1 | 9/2013 | Ichii | |
| 2013/0332913 A1 | 12/2013 | Dickenson | |
| 2014/0350910 A1 | 11/2014 | Talwadker | |
| 2015/0039764 A1 | 2/2015 | Beloglazov | |
| 2016/0140025 A1 | 5/2016 | Enright et al. | |
| 2016/0188431 A1 | 6/2016 | Chahal | |
| 2016/0239212 A1 | 8/2016 | Solihin | |
| 2016/0259714 A1* | 9/2016 | Shor | G06F 11/3676 |
| 2016/0266920 A1 | 9/2016 | Atanasov | |
| 2016/0335379 A1 | 11/2016 | Harn | |
| 2017/0153963 A1 | 6/2017 | Chahal | |
| 2017/0153966 A1* | 6/2017 | Cao | G06F 11/3688 |
| 2017/0178045 A1 | 6/2017 | Wasik | |
| 2018/0018617 A1 | 1/2018 | Banik | |
| 2018/0024911 A1* | 1/2018 | Kruszewski | G06F 11/3664 717/125 |
| 2018/0025289 A1 | 1/2018 | Doshi | |
| 2018/0121317 A1* | 5/2018 | Ekambaram | G06F 11/3616 |
| 2018/0217913 A1 | 8/2018 | Chahal et al. | |
| 2018/0246802 A1 | 8/2018 | Cerny | |
| 2018/0276325 A1 | 9/2018 | Polovick | |
| 2019/0042391 A1 | 2/2019 | Menon et al. | |
| 2019/0140910 A1 | 5/2019 | Ganapathi | |
| 2019/0179738 A1 | 6/2019 | Hawthorne | |
| 2019/0317880 A1 | 10/2019 | Herr | |
| 2020/0042419 A1 | 2/2020 | Wei | |
| 2020/0118039 A1 | 4/2020 | Kocberber | |
| 2020/0162352 A1 | 5/2020 | Jorgenson | |
| 2020/0218985 A1 | 7/2020 | Wei | |
| 2020/0279187 A1 | 9/2020 | Huang | |
| 2020/0320371 A1 | 10/2020 | Baker | |
| 2020/0379882 A1 | 12/2020 | Salunke | |
| 2020/0394462 A1 | 12/2020 | Hild | |

FOREIGN PATENT DOCUMENTS

| | | |
|---|---|---|
| CN | 104090748 B | 6/2017 |
| CN | 107678968 A | 2/2018 |
| FR | 3025036 A1 | 6/2019 |
| JP | 5170555 B2 | 1/2013 |

OTHER PUBLICATIONS

Chilowicz, M. et al., "Syntax Tree Fingerprinting: A Foundation for Source Code Similarity Detection"; HAL Id: hal-00627811 (2011); 19 pgs.

Stork, C. H. et al., "Compressed Abstract Syntax Trees for Mobile Code"; Department of Information and Computer Science University of California, Irvine (date unknown); 5 pgs.

Mell, P. et al., "Recommendations of the National Institute of Standards and Technology"; NIST Special Publication 800-145 (2011); 7 pgs.

Anonymous, "LLVM Bugpoint Tool: Design and Usage"; LLVM Complier Infrastructure; http://llvm.org/docs/Bugpoint.html (2020); 4pgs.

* cited by examiner

```
                                                    102
                                                  /
01 def divide(a, b):
02    return a / b
...
# Additional code ...
...
57 input = range(0, 100)
...
89 for i in input:
90    j = a + 1 + f
91    function_a()
92    function_b()
93    print(divide(1000, i))
...
# Additional code ...
...
```

```
                                                    115
                                                  /
Traceback (most recent call last):
   File "myprog.py", line 93, in <module>
   File "myprog.py", line 02, in divide
ZeroDivisionError: integer division or modulo by zero
```

```
                             135
                           /
01 def divide(a, b):
02    return a / b
03 input = range(0, 100)
04 for i in input:
05    print(divide(1000, i))
```

*FIG. 2*

CREATION OF MINIMAL WORKING EXAMPLES AND ENVIRONMENTS FOR TROUBLESHOOTING CODE ISSUES

BACKGROUND

Technical Field

The present disclosure generally relates to software development and troubleshooting.

Description of the Related Arts

Software developers create systems that rely on code they write and a set of software libraries that speed up system development. During the process of software development, it is common to reach a stage in which the developer faces a problem in their code (also known as bug, such as buffer overflow and division by zero) and ask for help in Internet- or community-based systems. In these community-based systems, helpers usually involve the so-called "Minimal Working Example" (MWE), which is a part of the source code that is able to reproduce the error the developer is facing without extraneous details.

A minimal working example is a collection of source code and other data files that allow a bug or problem to be demonstrated and reproduced. A minimal working example may also be referred to as a minimal reproducible example or short self-contained correct example. A minimal working example should be as small and as simple as possible, such that it is just sufficient to demonstrate the problem, but without any additional complexity or dependencies which will make resolution harder. A minimal working example is also deterministic in that it produces the same output for the same input as the original source code.

SUMMARY

Some embodiments of the disclosure provide a system for generating a minimum working example (MWE) of the source code of a computer program. The system receives the source code and executes the computer program. The system encounters a runtime error and obtains a stack trace from the execution of the computer program. The stack trace identifies runtime error and the code segments that were executed that led to the runtime error. The system uses the stack trace to identify one or more variables that affect a most recently executed segment of the source code when the runtime error occurred. The system identifies one or more segments of the source code that do not affect the identified relevant variables. In some embodiments, the one or more segments of the source code that do not affect the identified relevant variables are identified by using an abstract syntax tree of the source code. The system generates an MWE of the source code by pruning the identified one or more segments from the source code. In some embodiments, the system receives an instruction from a user interface and prunes a segment from the source code of the generated MWE based on the received instruction. The system may graphically present the abstract syntax tree of the source code at the user interface as one or more graphical user interface (GUI) elements and receives an instruction to modify the source code or the generated minimum working example based on a selection of a GUI element.

By using the stack trace from the execution of the computer program, the MWE generating system is able to quickly identify code segments that are needed to recreate a runtime error. The code segments are identified based on actual execution of the source code using actual inputs and other runtime conditions and therefore more relevant to the error. The efficiency of a software development tool is therefore improved.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 2 illustrates examples of source code, stack trace, and pruned code.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a system for generating a minimum working example (MWE) for debugging a computer program. Software developers create systems that rely on code they write and a set of software libraries that speed up system development. During the process of software development, it is common to reach a stage in which the developer faces a problem in their code (also known as bug) and they ask for help in Internet-based systems, such as Stack Overflow and Data Science Stack Exchange. In these community-based systems, helpers usually require the so called "Minimal Working Example" (MWE), which is a part of the source code that is able to reproduce the error the developer is facing. This MWE is time consuming to be created because it may come from large code bases and also depend on selecting proper input to the MWE and operating system libraries so helpers can provide proper guidance.

In some embodiments, the system receives a source code for the computer program. The system obtains a stack trace from executing the computer program, generated from the input source code, that results in an error. The system uses the stack trace to identify one or more variables that affect a most recently executed segment of the source code when the error occurred. The system identifies one or more segments of the source code that do not affect the identified relevant variables. The system then generates an MWE of the source code by pruning the identified one or more segments from the source code.

Figure 1:
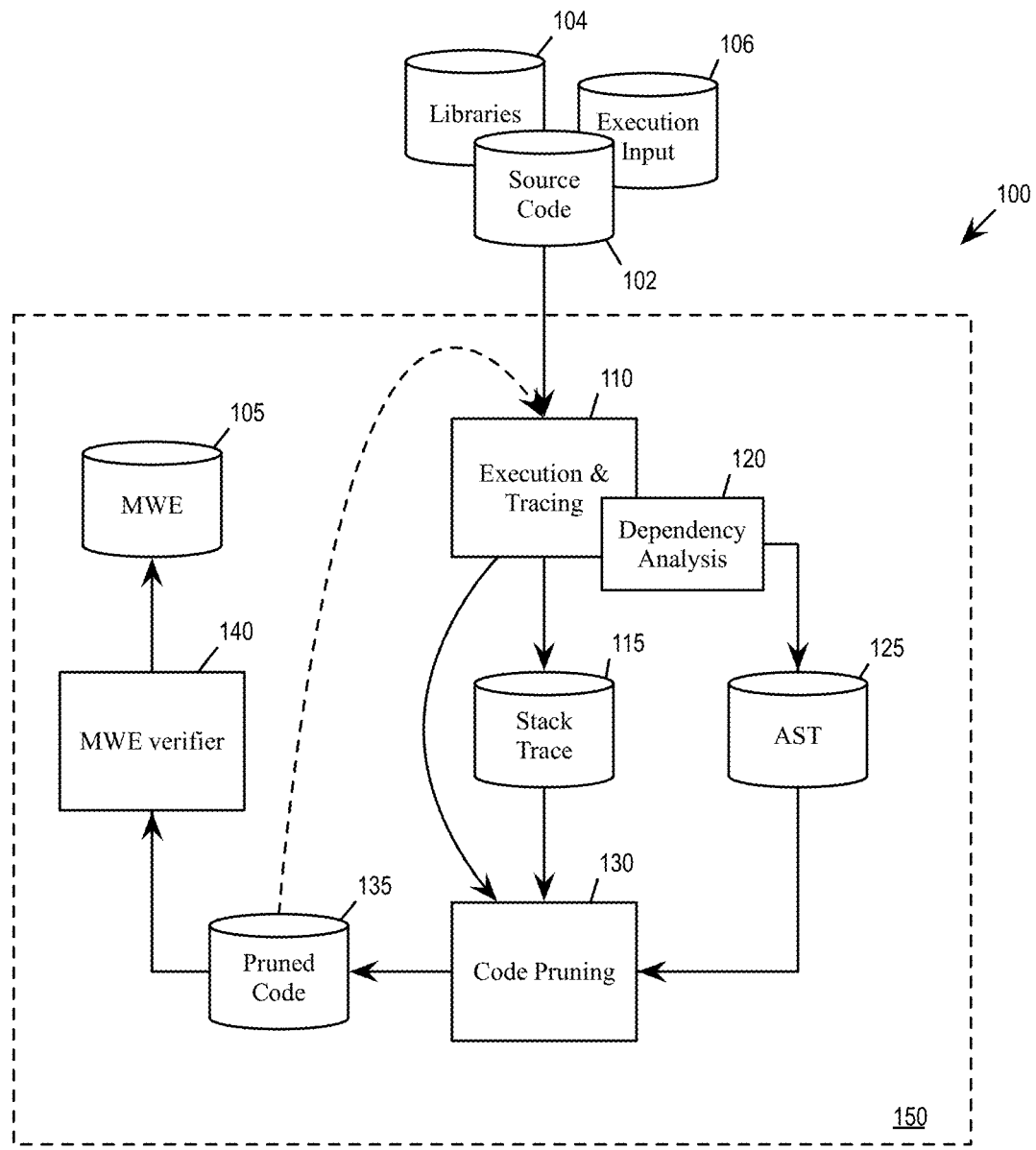
FIG. 1 illustrates a system for generating a minimum working example (MWE) of a computer program based on a runtime stack trace of the program, consistent with an embodiment of the disclosure.

FIG. 1 illustrates an MWE generating system 100, consistent with an embodiment. The MWE generating system 100 generates an MWE 105 for a source code 102. In some embodiments, the MWE generating system 100 is part of an integrated development environment (IDE) for software. As illustrated, the MWE generating system 100 includes an execution and tracing module 110, a dependency analysis module 120, a code pruning module 130, and an MWE verifier 140. The MWE generating system 100 may be implemented by a computing device 150. In some embodiments, the modules 110, 120, 130, and 140 are modules of software instructions being executed by one or more processing units (e.g., a processor) of the computing device 150. In some embodiments, the modules 110, 120, and 130 are modules of hardware circuits implemented by one or more integrated circuits (ICs) of an electronic apparatus. Though the modules 110, 120, and 130 are illustrated as being separate modules, some of the modules can be combined into a single module. An example computing device 600 that may implement the computing device 150 will be described by reference to FIG. 6 below.

The execution and tracing module 110 executes the source code 102 (or a computer program thereof). The execution of the source code 102 may invoke a set of libraries 104 and use execution input 106 as input stimuli. The execution and tracing module 110 generates a set of stack traces 115 while executing the source code 102. The dependency analysis module 120 analyzes the source code 102 to generate an abstract syntax tree (AST) 125. When a runtime error occurs during the execution of the source code 102, the code pruning module 130 uses the generated stack trace 115 and the generated abstract syntax tree 125 to identify code segments that are irrelevant to the runtime error (i.e., do not affect the runtime error) and to create a pruned code 135 in which the irrelevant code segments are pruned off. In some embodiments, the code pruning module 130 receives instructions from a user interface that specifically identifies a code segment to prune off.

The MWE generating system 100 may accept the pruned code 135 as the MWE 105 if the MWE verifier 140 verifies that executing the pruned code 135 would result in the same runtime error as the source code 102. The MWE generating system 100 may also feed the pruned code 135 back to the MWE generating system 100 for further analysis and pruning. The operations of the MWE generating system 100 will be further described by reference to FIG. 2, which shows examples of the source code 102, the stack trace 115, and the pruned code 135.

As illustrated, the source code 102 is from a file called "myprog.py." The source code file includes more than 93 lines of code, each line of code is uniquely indexed with a line number. The execution of the source code 102 (by the execution and tracing module 110) generates the stack trace 115, which indicates that there is a runtime error of "integer division by zero." The stack trace 115 also records the line numbers of the lines of code that were executed, in the order that they were executed. A stack trace (also called stack backtrace or stack traceback) is a report of the active stack frames at a certain point (e.g., the occurrence of the runtime error) during the execution of the program. Each time a function in the program is called, a block of memory is allocated on top of the runtime stack called the activation record (or stack pointer.) An activation record allocates memory for the function's parameters and local variables declared in the function. The stack trace 115 reports line numbers with the most recent calls last. In some embodiments, the stack trace may present the same information in reverse order, with the most recent calls being presented first.

In the example, according to the stack trace 115, line "02" of the file "myprog.py" was executed right before the runtime error was encountered. Line "02" of the file "myprog.py" is the start of a function called "divide." In other words, according to the stack trace 115, the function "divide" is the most recently executed code segment when the runtime error "integer division by zero" occurred. The stack trace 115 also indicates that line "93" of the file "myprog.py" was executed prior to the function "divide" was invoked.

The MWE generating system 100 (at the code pruning module 130) uses the stack trace 115 to identify variables in the source code 110 that are relevant to the "integer division by zero" runtime error. The MWE generating system also traces variable dependencies of the source code to identify other relevant variables that may affect the runtime error. The code segments of the source code 102 that may affect the computation of these identified relevant variables are considered as relevant code segments.

In the example of FIG. 2, according to the stack trace 115, the runtime error occurred at line "02." which features a computation based on variables "a" and "b." The MWE generating system 100 (at the code pruning module 130) in turn traces variable "a" to an argument at line "01." which is filled by an immediate value "1000" at line "93." The MWE generating system #100 traces the variable "b" to an argument at line "01." which is filled by an index "i" at lines "93." and "89." The index "i" is further traced back to a variable "input" that is defined at line "57." As a result, the MWE generating system 100 determines that lines "01." "02." "57." "89." "93." are relevant to (i.e., may affect) the "divide by zero" runtime error. Correspondingly, the MWE generating system 100 generates the pruned code 135 that includes only lines "01." "02." "57." "89." "93." (which are correspondingly renumbered as "01." "02." "03." "04." "05.")

The MWE generating system 100 may verify (at the MWE verifying module 140) that the pruned code 135 does indeed generate the same "integer division by zero" runtime error when provided with the same execution input 106. If so, the pruned code 135 may be provided as the product of the MWE generating system 100, i.e., the minimal working example or MWE. In some embodiments, the pruned code 135 is fed back to the MWE generating system 100 for further optimization (i.e., to further prune in order to generate a smaller MWE).

When pruning the source code for generating the MWE, the system 100 identifies one or more segments of the source code that do not affect the identified relevant variables. In some embodiments, the one or more segments of the source code that do not affect the computing of the identified relevant variables may be identified by using an abstract syntax tree of the source code. An abstract syntax tree (AST), or syntax tree, is a tree representation of the abstract syntactic structure of source code written in a programming language. Each node of the tree denotes a construct occurring in the source code. In some embodiments, the MWE generating system 100 analyzes the source code 102 to generate the AST 125 (at the dependency analysis module 120).

In some embodiments, the MWE generating system 100 uses the stack trace 115 to identify variables that are relevant to the runtime error and to identify variables that are not relevant to the runtime error. The variables that are identified as being irrelevant to (i.e., do not affect) the runtime error are in turn used to identify code segments and/or libraries that are not necessary for generating the MWE 105. For example, syntax constructs in the AST 125 may be identified as being irrelevant to the runtime error, and the MWE generating system 100 (at the code pruning module 130) correspondingly remove the subtrees beneath the identified syntax constructs. The removed subtrees may correspond to code segments in the source code 102, or entire libraries. The removed code segments are absent from the MWE 105. The removed libraries are not invoked by the MWE 105.

Figure 3:
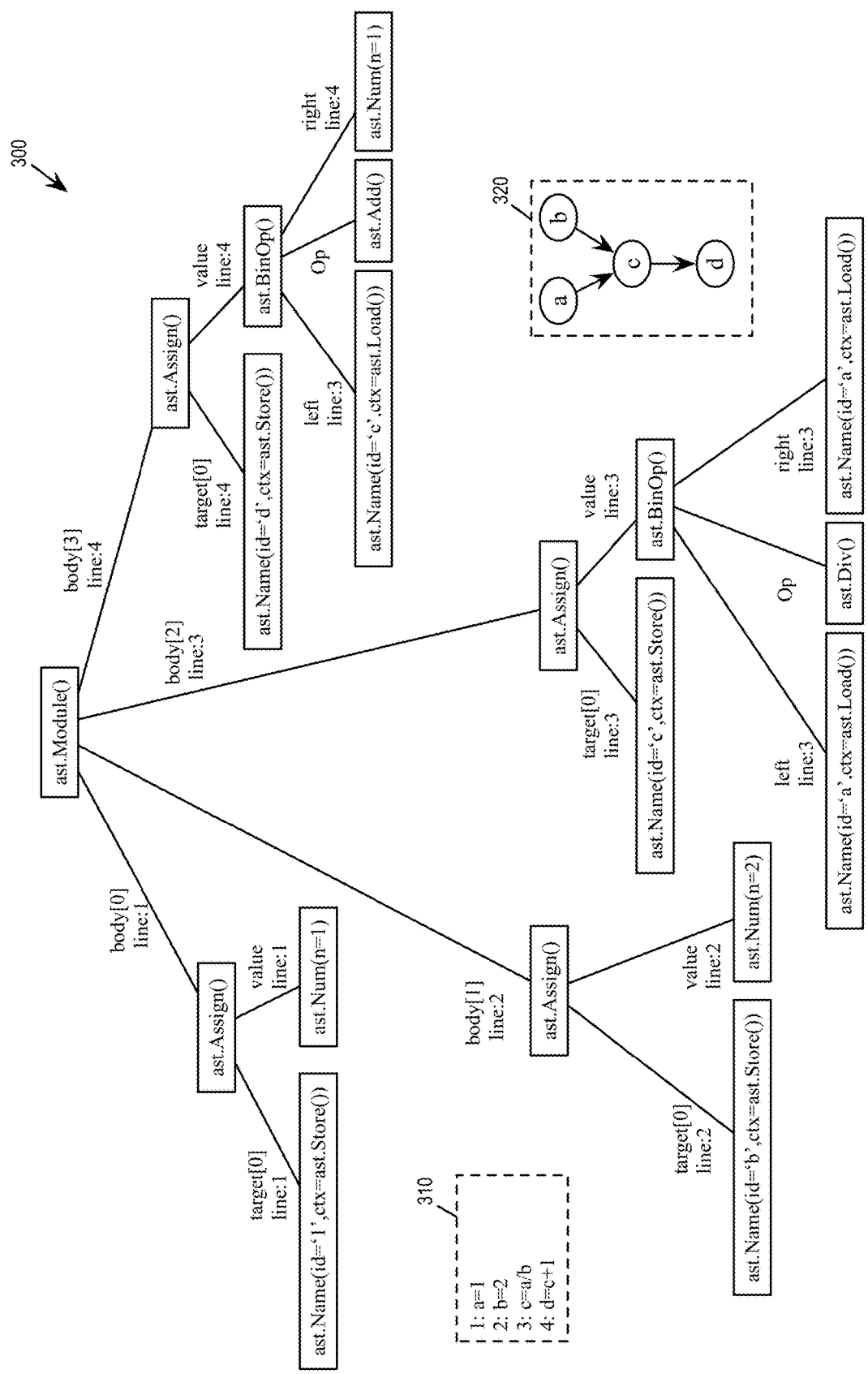
FIG. 3 conceptually illustrates an example abstract syntax tree.

FIG. 3 conceptually illustrates an example abstract syntax tree 300. As illustrated, the AST 300 is generated based on a code block 305 written in the Python programming language (numbers left of the colon indicate the line number). Line number information persists when transforming the source code into the AST 300, while a variable dependency graph 310 outlines the flow of information between variables in the program. Together with the runtime information of the stack trace of program failures, the system is able to determine in which line of the code the problem occurred, since this information is present in the stack trace. From this line, the system can gather which variables were involved and walk the dependency graph backwards finding which variables belong to the minimum set of variables needed to reproduce the issue. Once these variables are determined, the AST is pruned based on this set of variables. After pruning, the AST can be translated back to source code, generating a reduced source code and potential MWE.

In some embodiments, the AST may be used to create a mapping between line numbers and AST nodes. A dependency graph of variables may be used to determine how variables relate to each other. Once an error is found, dependency information can be propagated through this graph and, by mapping nodes in this graph to nodes in the AST, to determine which lines are important to reproduce the error. A call graph of function calls may be used to determine which library calls are made in the code. By mapping nodes in the call graph to nodes in the AST, the system may determine which lines are important to reproduce the error with regards to function calls and library calls.

In some embodiments, a user interface may be used to graphically present the generated AST 125. The various constructs of the AST may be presented as selectable graphical user interface elements such that a user may select one or more constructs to remove. The user interface can be used to receive an instruction to modify the source code 102 or the generated MWE 105 based on a selection of a graphical user interface element. Such a user interface may help the user identify external or Internet-based services and computationally expensive function calls to prune off from the source code. The user interface may refer to a user interface of the computing device 150. The user interface may also refer to a user interface of a separate user device such that the computing device 150 sends data capturing a graphical representation of the abstract syntax tree of the source code to be displayed on the user interface of the user device.

In some embodiments, the system solicits (generates a prompt) for human input for further reduction of the generated MWE when a complexity measure of the MWE is greater than a threshold. In some embodiments, the system analyses the dependency graphs (both the call graph and the variable dependency graphs) and checks whether there are long strings of single dependencies such as "a→b→c→d→e→f" (in which "→" denotes a dependency relation, independent of whether there is a value dependency or a function call dependency). A configurable threshold can be used so that the system, when seeing long dependencies, is able to ask users for guidance in replacing parts of the graph. In the example above, the system could potentially ask the user whether it would be possible to contract "b→c→d→e" into something smaller, such as "b→e". In some embodiments, the MWE generating system 100 may trigger a routine to solicit user input by computing a diameter and an average and a maximum vertex degree of the dependency graphs, where the diameter of a graph is the greatest distance between any pair of vertices, and the degree of a vertex in a graph is the number of edges that are incident on the vertex. The system may also compute the cyclomatic complexity of the MWE code and to request user input when the complexity is above a given configurable threshold, where cyclomatic complexity of a section of source code is the number of linearly independent paths within it.

In addition to providing a pruned code as MWE, the MWE generating system 100 may also reduce the size of the execution input (e.g., to be delivered along with the MWE of the source code). In the example of FIG. 2, the MWE generating system 100 executes the source code 102 (or a computer program thereof) by using the execution input 106 as input. For an execution input that is too large, the MWE generating system 100 may identify a subset of the execution input 106 as being sufficient to cause the runtime error. In some embodiments, a binary search is used to identify a subset of the execution inputs 106 as being relevant. The MWE generating system 100 may also identify a subset of the execution input 106 near the time the runtime error occurred, as being relevant. The identified relevant subset of the execution input 106 is used as the input for the MWE. The MWE generating system 100 may also accept a set of user specified input for the MWE.

In some embodiments, the MWE generating system 100 also generates a set of virtual resources to create a virtual working environment for executing the generated MWE 105. Specifically, upon generating the MWE 105, the MWE generating system 100 analyzes a call graph to identify the libraries that are required by the MWE. The system 100 creates a new virtual working environment for creating a container or a virtual machine template for cloud execution. The system 100 also installs a language runtime library and other libraries used by the MWE into the container or the virtual machine template. The system 100 then installs the generated MWE into this new virtual working environment, which is a working minimal environment for running the MWE.

Figure 4:
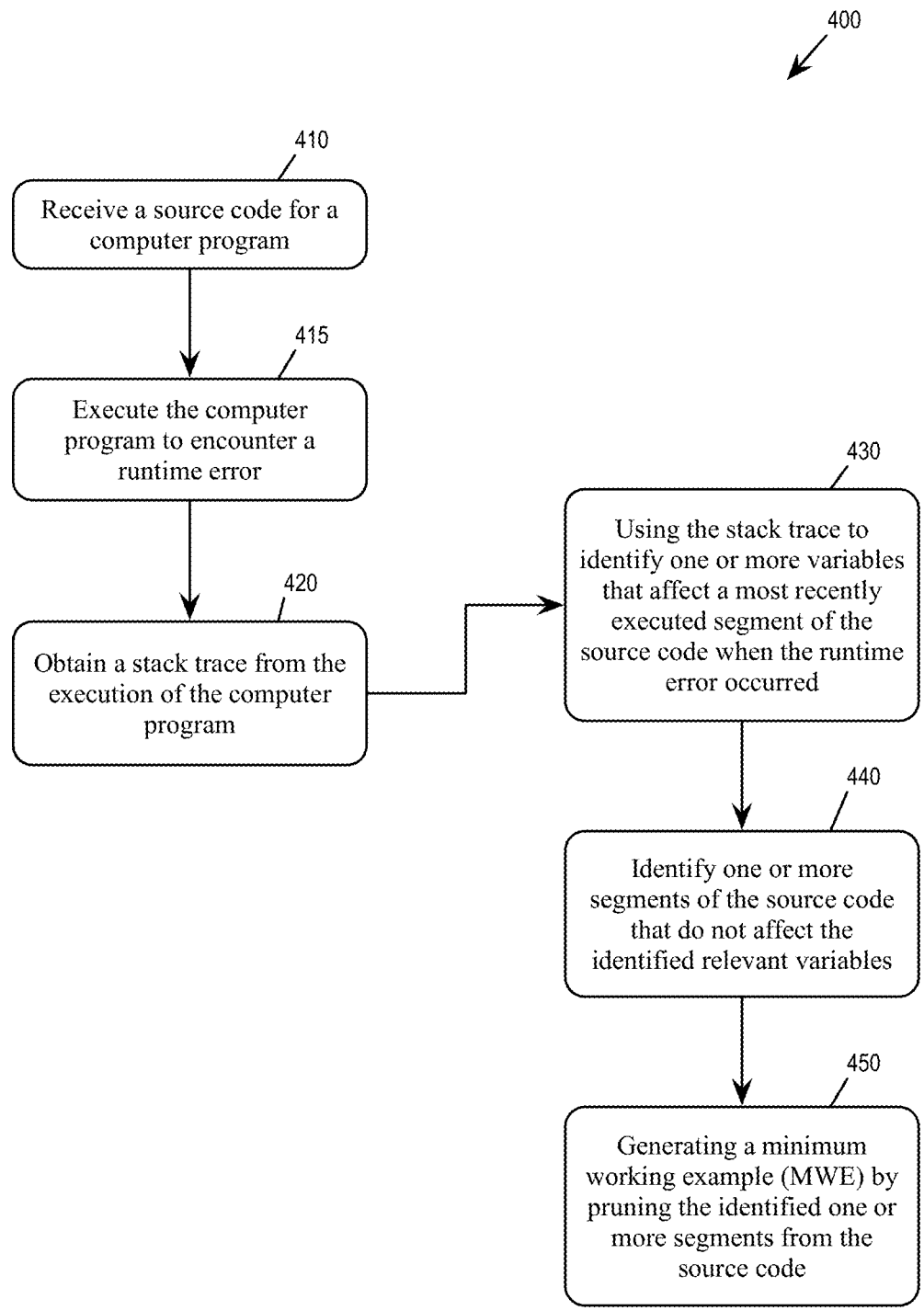
FIG. 4 conceptually illustrates a process for generating an MWE of a computer program based on a runtime stack trace of the program, consistent with an exemplary embodiment.

FIG. 4 conceptually illustrates a process 400 for generating a minimum working example (MWE) of a computer program based on a runtime stack trace of the program, consistent with an exemplary embodiment. In some embodiments, one or more processing units (e.g., processor) of a computing device implementing the MWE generating system 100 (e.g., the computing device 150) perform the process 400 by executing instructions stored in a computer readable medium.

The system receives (at block 410) a source code for the computer program. The system executes (at block 415) the computer program and encounters a runtime error. The system obtains (at 420) a stack trace from the execution of the computer program. The stack trace identifies runtime error and the code segments that were executed that lead to the runtime error.

The system uses (at block 430) the stack trace to identify one or more variables that affect a most recently executed segment of the source code when the runtime error occurred. The system identifies (at block 440) one or more segments of the source code that do not affect the identified relevant variables. In some embodiments, the one or more segments of the source code that do not affect the identified relevant variables are identified by using an abstract syntax tree of the source code.

The system generates (at block 450) an MWE of the source code by pruning the identified one or more segments from the source code. In some embodiments, the system receives an instruction from a user interface and prunes a segment from the source code or the generated minimum working example based on the received instruction. The system may graphically present the abstract syntax tree of the source code at the user interface as one or more graphical user interface (GUI) elements and receives an instruction to modify the source code or the generated minimum working example based on a selection of a GUI element.

Figure 5A:
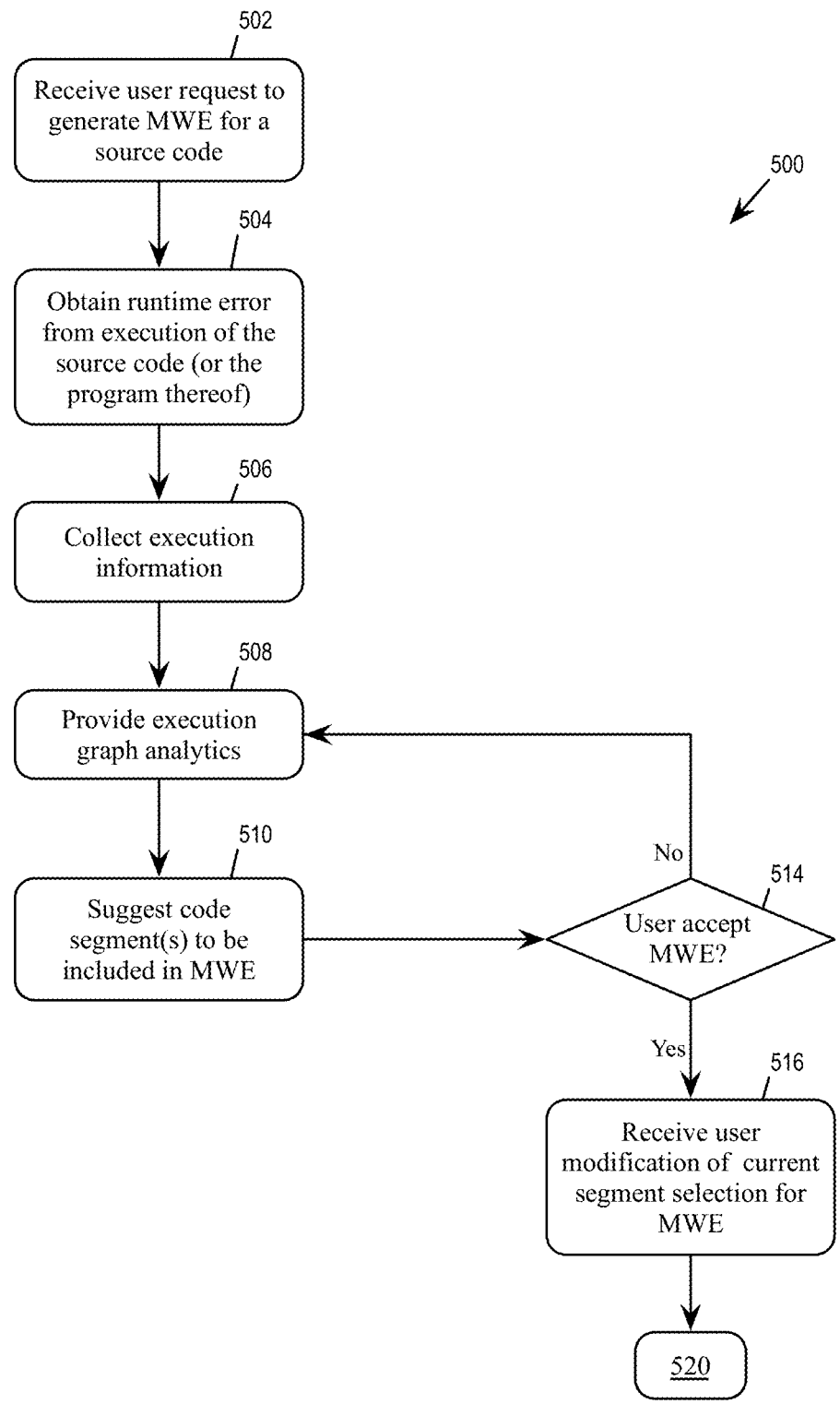
FIGS. 5a-b conceptually illustrates a process that facilitates user specification of MWE deliverables, consistent with an exemplary embodiment.
Figure 5B:
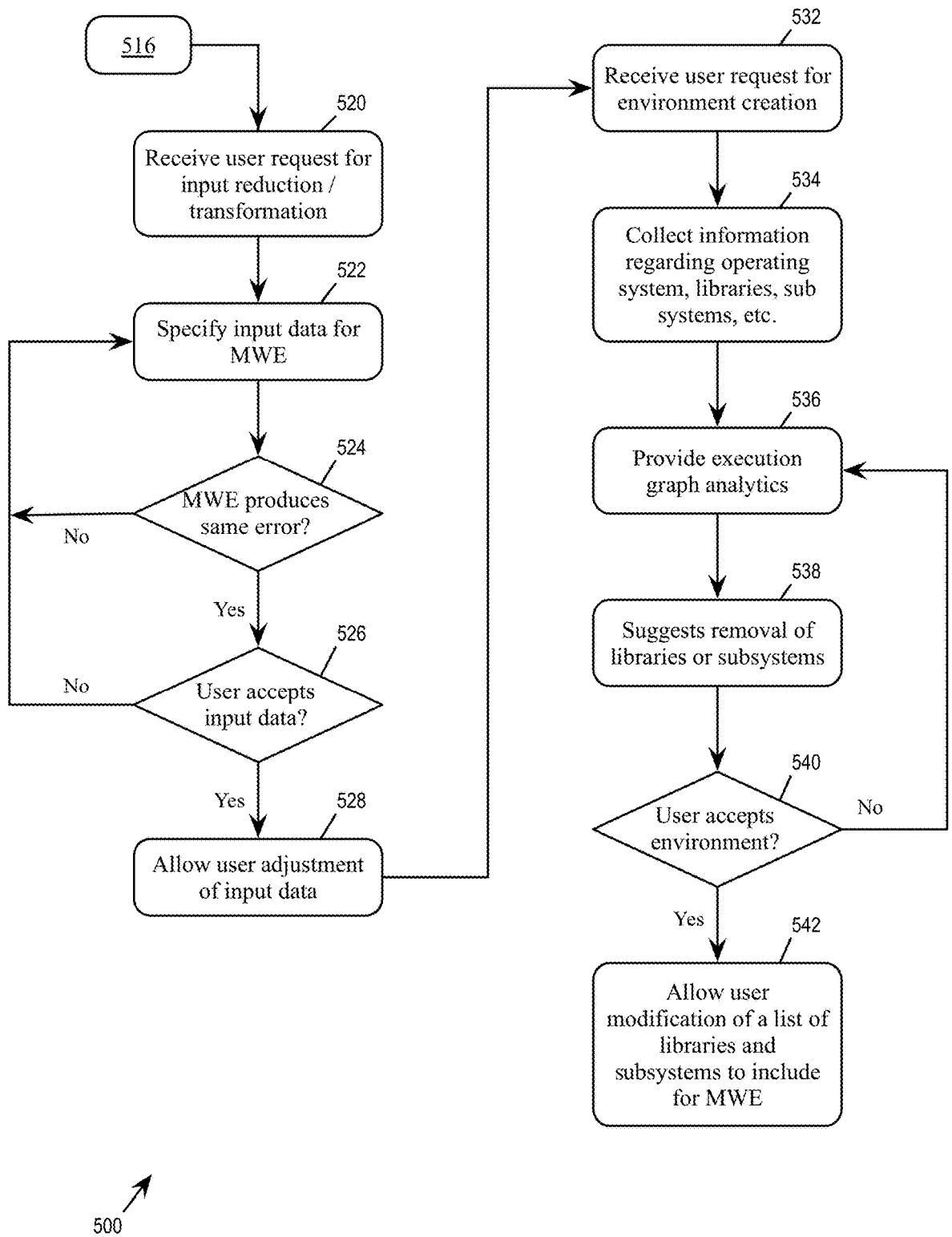

In some embodiments, the MWE generating system 100 allows the user to specify a set of MWE deliverables. The set of MWE deliverables may include the MWE, a set of data inputs that can be used to recreate the runtime error, as well as a set of libraries used by the MWE. The set of MWE deliverables are incorporated into a virtual working environment for a container or a virtual machine template. FIGS. 5a-b conceptually illustrate a process 500 that facilitates user specification of MWE deliverables, consistent with an exemplary embodiment. In some embodiments, one or more processing units (e.g., processor) of a computing device implementing the MWE generating system 100 (e.g., the computing device 150) perform the process 500 by executing instructions stored in a computer readable medium.

The system receives (at block 502) a user request to generate an MWE for a source code. The system obtains (at block 504) runtime error upon execution of the source code (or the program thereof). The system collects (at block 506) execution information such as the stack trace and variable values. The system provides (at block 508) execution graph analytics. The system suggests (at 510) code segment(s) to be included in the MWE. The system determines (at block 514) whether the user has accepted the generated MWE. If so, the process proceeds to block 516. If the user does not accept the generated MWE, the process returns to block 508. At block 516, the system receives user modification of current segment selection for the generated MWE. The process then proceeds to block 520.

The system receives (at block 520) a user request for an input reduction transformation. The system specifies (at block 522) input data for the MWE by e.g., transforming the original input data or by receiving user specified data from a user interface. The system determines (at block 524) whether the MWE is able to produce the same error based on the specified input data. If not, the process returns to block 522. If so, the system determines (at block 526) whether the user accepts input data. If not, the process returns to block 522. If so, the system allows (at block 528) user adjustment of the input data. The process then proceeds to 532.

The system receives (at block 532) user request for creating a virtual working environment for the MWE. The system collects (at block 534) information regarding the operating system, the libraries, and the sub systems, etc., for running the MWE. The system provides (at block 536) execution graph analytics. The system suggests (at block 538) removal of certain libraries or sub systems from inclusion in the virtual working environment. The system determines (at block 540) whether the user accepts the created environment. If not, the process returns to 536. If so, the process proceeds to block 542 to allow the user to modify a list of libraries and subsystems to include in the virtual working environment.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 4 and 5a-b) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
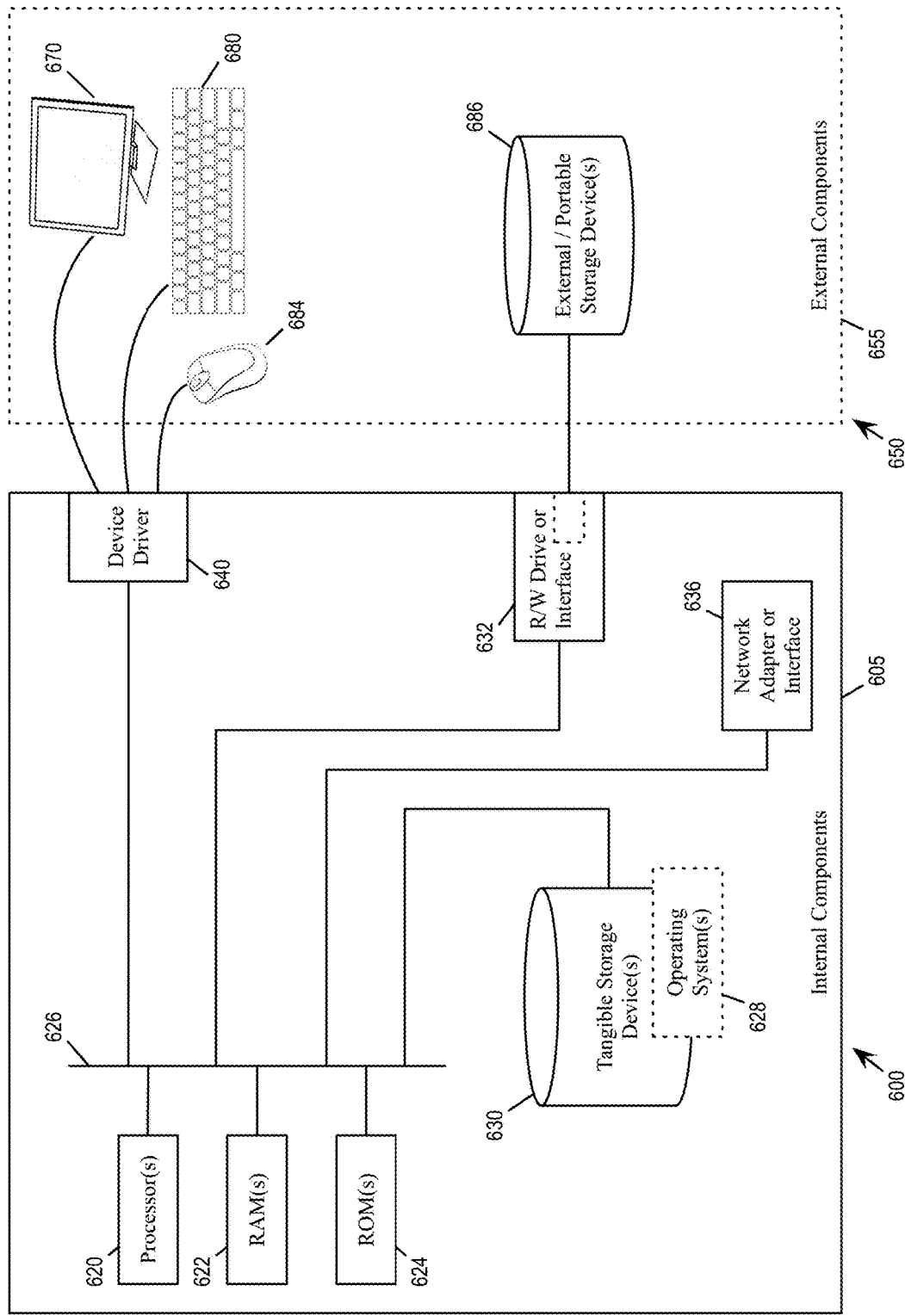
FIG. 6 shows a block diagram of the components of a data processing system in accordance with an illustrative embodiment.

FIG. 6 shows a block diagram of the components of data processing systems 600 and 650 that may be used to implement the MWE generating system 100 in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing systems 600 and 650 are representative of any electronic device capable of executing machine-readable program instructions. Data processing systems 600 and 650 may be representative of a smart phone, a computer system, PDA, or other electronic devices. Examples of computing systems, environments, and/or configurations that may represented by data processing systems 600 and 650 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 600 and 650 may include a set of internal components 605 and a set of external components 655 illustrated in FIG. 6. The set of internal components 605 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628 and programs such as the programs for executing the processes 400 and 500 are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 605 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the processes 400 and 500 can be stored on one or more of the respective portable computer-readable tangible storage devices 686, read via the respective R/W drive or interface 632 and loaded into the respective hard drive 630.

The set of internal components 605 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 655 can include a computer display monitor 670, a keyboard 680, and a computer mouse 684. The set of external components 655 can also include touch screens, virtual keyboards, touch pads, pointing devices, and other human interface devices. The set of internal components 605 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 7:
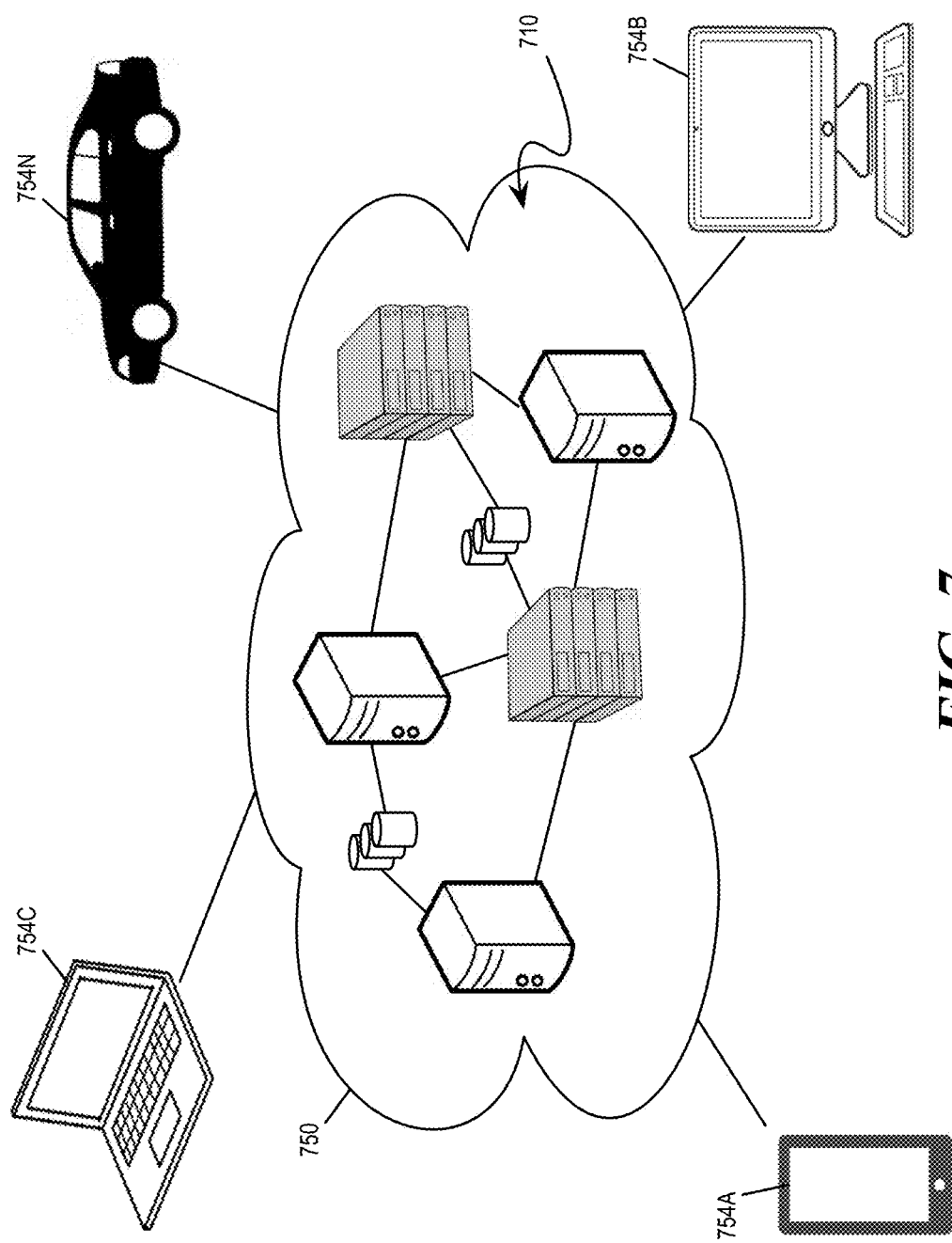
FIG. 7 illustrates an example cloud-computing environment.

Referring now to FIG. 7, an illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
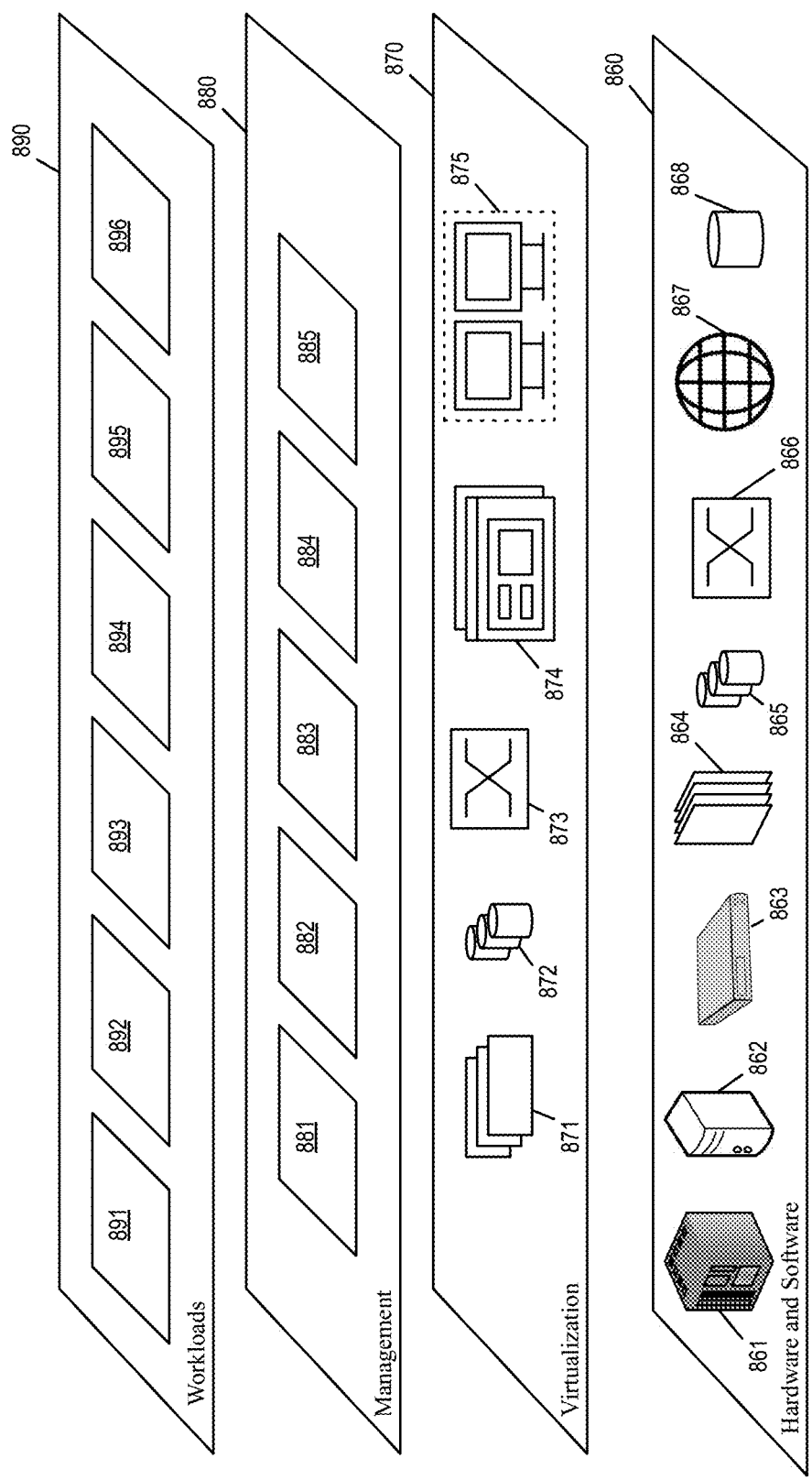
FIG. 8 illustrates a set of functional abstraction layers provided by a cloud-computing environment, consistent with an exemplary embodiment.

Referring now to FIG. 8, a set of functional abstraction layers provided by cloud computing environment 750 (of FIG. 7) is shown. It should be understood that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud-computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and workload 896. In some embodiments, the workload 896 performs some of the operations of the MWE generating system 100. In some embodiments, the workload 896 performs operations necessary to support a virtual environment for MWE that is generated by the MWE generating system 100.

By using the stack trace from the execution of the computer program, the MWE generating system 100 is able to quickly identify code segments that are needed to recreate a runtime error. The code segments are identified based on actual execution of the source code using actual inputs and other runtime conditions and therefore more relevant to the error. The efficiency of a software development tool is therefore improved.

The foregoing one or more embodiments implements an MWE generating system within a computer infrastructure by having one or more computing devices executing a computer program and generates a stack trace. The computer infrastructure is further used to process the stack trace and trace variable dependencies in the software in order to identify code segments that are necessary for a minimum working example (MWE).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
   a processor; and
   a storage device storing a set of instructions, wherein an execution of the set of instructions by the processor configures the computing device to perform acts comprising:
   receiving a source code for a computer program;
   executing the computer program to result in a runtime error;
   obtaining a stack trace from an execution of the computer program;
   using the stack trace to identify one or more variables that affect a most recently executed segment of the source code when the runtime error occurred;
   identifying one or more segments of the source code that do not affect the identified relevant variables; and
   generating a minimum working example (MWE) of the source code by pruning the identified one or more segments from the source code, wherein by using the stack trace from the execution of the computer program, the computing device is able to quickly identify code segments to recreate the runtime error.

2. The computing device of claim 1, wherein the one or more segments of the source code that do not affect the identified relevant variables are identified by using an abstract syntax tree of the source code.

3. The computing device of claim 2, wherein an execution of the set of instructions by the processor further configures the computing device to perform acts comprising:

graphically presenting the abstract syntax tree of the source code at a user interface as one or more graphical user interface (GUI) elements; and receiving an instruction to modify the source code or the generated MWE based on a selection of a GUI element of the abstract syntax tree.

4. The computing device of claim 1, wherein an execution of the set of instructions by the processor further configures the computing device to perform acts comprising:

receiving an instruction from a user interface; and pruning a segment from the source code of the generated minimum working example based on the received instruction.

5. The computing device of claim 1:

wherein the execution of the computer program that results in the runtime error is based on a set of execution inputs; and wherein an execution of the set of instructions by the processor further configures the computing device to identify a subset of the set of execution inputs that is sufficient to result in the runtime error.

6. The computing device of claim 1, wherein an execution of the set of instructions by the processor further configures the computing device to perform acts comprising:

identifying a library used by the MWE; and creating a virtual working environment for a container or a virtual machine template that incorporates the identified library.

7. The computing device of claim 1, wherein an execution of the set of instructions by the processor further configures the computing device to perform acts comprising:

generating a prompt for a reduction of the generated MWE when a complexity measure of the generated MWE is greater than a threshold.

8. A computer program product comprising:

one or more non-transitory computer-readable storage devices and program instructions stored on at least one of the one or more non-transitory storage devices, the program instructions executable by a processor, the program instructions comprising sets of instructions for:

receiving a source code for a computer program;

obtaining a stack trace from an execution of the computer program that results in a runtime error;

using the stack trace to identify one or more variables that affect a most recently executed segment of the source code when the runtime error occurred;

identifying one or more segments of the source code that do not affect the identified relevant variables; and generating a minimum working example (MWE) of the source code by pruning the identified one or more segments from the source code, wherein by using the stack trace from the execution of the computer program, a computing device is able to quickly identify code segments to recreate the runtime error.

9. The computer program product of claim 8, wherein the one or more segments of the source code that do not affect the identified relevant variables are identified by using an abstract syntax tree of the source code.

10. The computer program product of claim 9, wherein the program instructions further comprising sets of instructions for:

graphically presenting the abstract syntax tree of the source code at a user interface as one or more graphical user interface (GUI) elements; and receiving an instruction to modify the source code or the generated MWE based on a selection of a GUI element of the abstract syntax tree.

11. The computer program product of claim 8, wherein the program instructions further comprising sets of instructions for:

receiving an instruction from a user interface; and pruning a segment from the source code or the generated minimum working example based on the received instruction.

12. The computer program product of claim 8, wherein:

the execution of the computer program that results in the runtime error is based on a set of execution inputs; and the program instructions further comprise sets of instructions for identifying a subset of the execution inputs that is sufficient to result in the runtime error.

13. The computer program product of claim 8, wherein the program instructions further comprising sets of instructions for:

identifying a library used by the MWE; and creating a virtual working environment for a container or a virtual machine template that incorporates the identified library.

14. A computer-implemented method comprising:

receiving a source code for a computer program;

obtaining a stack trace from an execution of the computer program that results in a runtime error;

using the stack trace to identify one or more variables that affect a most recently executed segment of the source code when the runtime error occurred;

identifying one or more segments of the source code that do not affect the identified relevant variables; and generating a minimum working example (MWE) of the source code by pruning the identified one or more segments from the source code, wherein by using the stack trace from the execution of the computer program, a computing device is able to quickly identify code segments to recreate the runtime error.

15. The computer-implemented method of claim 14, wherein the one or more segments of the source code that do not affect the identified relevant variables are identified by using an abstract syntax tree of the source code.

16. The computer-implemented method of claim 15, further comprising:

graphically presenting the abstract syntax tree of the source code at a user interface as one or more graphical user interface (GUI) elements; and receiving an instruction to modify the source code or the generated MWE based on a selection of a GUI element of the abstract syntax tree.

17. The computer-implemented method of claim 14, further comprising:

receiving an instruction from a user interface; and pruning a segment from the source code or the generated minimum working example based on the received instruction.

18. The computer-implemented method of claim 14, wherein the execution of the computer program that results in the runtime error is based on a set of execution inputs, the method further comprising identifying a subset of the execution inputs that is sufficient to result in the runtime error.

19. The computer-implemented method of claim 14, further comprising:

identifying a library used by the MWE; and creating a virtual working environment for a container or a virtual machine template that incorporates the identified library.

20. The computer-implemented method of claim 14, further comprising:

generating a prompt for a reduction of the generated MWE when a complexity measure of the generated MWE is greater than a threshold.

* * * * *